United States Patent
Cryer et al.

(10) Patent No.: US 7,165,442 B2
(45) Date of Patent: Jan. 23, 2007

(54) METHOD OF DETECTING A WATER LEAK IN A LOCOMOTIVE

(75) Inventors: Robert Douglas Cryer, Erie, PA (US); Thomas Charle Sonney, Wattsburg, PA (US); Manoj P. Kumar, Bangalore (IN); William Joseph Ruprecht, III, Slippery Rock, PA (US); Charles Joseph Waugaman, New Wilmington, PA (US); Matthew Lee Swedberg, Aliquippa, PA (US); Dennis William McAndrew, Waterford, PA (US); John Albert Mayle, Erie, PA (US)

(73) Assignee: General Electric Company, Schenectady, NY (US)

( * ) Notice: Subject to any disclaimer, the term of this patent is extended or adjusted under 35 U.S.C. 154(b) by 54 days.

(21) Appl. No.: 11/006,357

(22) Filed: Dec. 7, 2004

(65) Prior Publication Data

US 2005/0120777 A1    Jun. 9, 2005

Related U.S. Application Data

(60) Provisional application No. 60/527,724, filed on Dec. 8, 2003.

(51) Int. Cl.
*G01M 3/04*    (2006.01)
(52) U.S. Cl. .................. 73/40; 73/49.7; 73/37
(58) Field of Classification Search ............ 73/40, 73/49.7, 37
See application file for complete search history.

(56) References Cited

U.S. PATENT DOCUMENTS 2,124,523 A * 7/1938 Blanton ............... 123/41.49

OTHER PUBLICATIONS www.epa.gov/compliance/resources/ publications/monitoring/selfevaluation/railwrkbk.pdf , p. 49 of 108.*

*Primary Examiner*—Hezron Williams
*Assistant Examiner*—Rodney Frank
(74) *Attorney, Agent, or Firm*—Carlos L. Hanze; Timothy H. Van Dyke; Beusse Wolter Sanks Mora & Maire

(57) ABSTRACT

Disclosed herein are methods for detecting a water leak in a locomotive engine cooling system comprising numerous components, each being a potential source of leakage of water. The method typically comprises performing at least one inspection providing an indication of a water leak from an engine cooling system of the locomotive. The step of performing at least one inspection may comprise at least one of several steps including performing a visual inspection to determine if water is leaking from a portion of the cooling system external to the engine; performing a visual inspection of exhaust of the engine to detect an indication of water vapor in the exhaust; performing a visual inspection to detect an indication of water leaking into an intake air manifold 30 of the engine; performing an engine oil analysis to detect water in the engine lubricant; reviewing a fault log history for the locomotive; and checking a level of a cooling system sight glass. The method allows for the isolation of potential sources of the water leak from one another so as to prevent false positive leak identification caused by transient water flow between the potential sources. If an engine cylinder assembly is a component identified as a potential source of the water leak during the water pressurization test, the method enables further testing to confirm leakage at such cylinder assembly, before undertaking the costly and time-consuming process of removing the cylinder assembly from the engine. Cylinder assemblies can be tested for leaks by performing an air leak test disclosed herein.

10 Claims, 2 Drawing Sheets

U.S. PATENT DOCUMENTS

| | | | |
|---|---|---|---|
| 4,356,833 A | * | 11/1982 | Mayfield et al. ............... 137/62 |
| 4,508,132 A | * | 4/1985 | Mayfield et al. ............... 137/62 |
| 4,922,999 A | * | 5/1990 | Stokes et al. ................ 165/286 |
| 5,009,848 A | * | 4/1991 | Secretarski et al. ............ 422/62 |
| 5,272,911 A | * | 12/1993 | Beggs et al. .................. 73/49.7 |
| 5,446,389 A | * | 8/1995 | Lenz ........................... 324/555 |
| 5,845,272 A | * | 12/1998 | Morjaria et al. ............... 706/50 |
| 6,947,797 B2 | * | 9/2005 | Dean et al. .................... 700/79 |

* cited by examiner

METHOD OF DETECTING A WATER LEAK IN A LOCOMOTIVE

This application claims the benefit of U.S. Provisional Application No. 60/527,724, filed Dec. 8, 2003, incorporated herein by reference.

FIELD OF THE INVENTION

This invention relates generally to the field of maintenance and repair, and more particularly to a method of detecting a water leak in a locomotive.

BACKGROUND OF THE INVENTION

Locomotives are returned periodically to a service facility for preventative and corrective maintenance. The engine cooling system of a locomotive is an important system that is routinely inspected. The frequency of inspection of a locomotive cooling system may vary from one railroad to another, with annual and condition-based inspections often specified. The inspection is performed by visually checking for leaks while applying hydrostatic pressure to the cooling system with the locomotive engine in a cold shutdown condition; commonly called a "squeeze test." If a fluid leak is detected, the suspect part is repaired or it is removed and replaced.

Water leaks have been known to occur at a variety of locations in a locomotive, both from engine components and from cooling system components apart from the engine, i.e. piping, valves, pumps, sight glass, etc. Engine components known to leak water include the turbocharger, the intercooler, the fuel heater, and the cylinder assembly (power assembly). While it may be relatively easy to repair or replace some cooling system components, the repair of engine components, particularly engine power assemblies, is a costly and time-consuming matter.

DETAILED DESCRIPTION OF THE INVENTION

The present inventors have found that a high percentage of the power assemblies that are removed from locomotive engines for water leak repairs based on the commonly accepted "squeeze test" were not in fact actually leaking once they are disassembled and fully inspected. The inventors believe that such power assemblies are removed in error because the prior art water leak detection process is not capable of accurately determining the source of a water leak detected during a squeeze test. In particular, the inventors have found that water leaking from within a locomotive engine may migrate within the engine to reveal itself at a location remote from the actual source of the leak. Such transient water may then be misinterpreted as an indication that a watertight component is leaking.

In addition, the "squeeze test" is done under static conditions (i.e., with no flow of water through the engine) and typically at cold (as opposed to normal operating) temperature engine conditions. Further the squeeze test is done at the same uniform pressure for all engine components, even though in the operation of these components they are typically exposed to fluid pressure at a significantly different level (i.e., with some components being exposed to a higher fluid pressure and other components being exposed only to a lower pressure) from that of the squeeze test. This can lead to indications of leaks in testing that are not present during operating conditions. These false reads (like the above-noted inaccurate identifications of leaking components) results in unnecessary repair activity that is not only expensive and time-consuming, but also presents an intrusive activity that can generate additional defects in the engine when re-assembled and returned to service.

Figure 1:
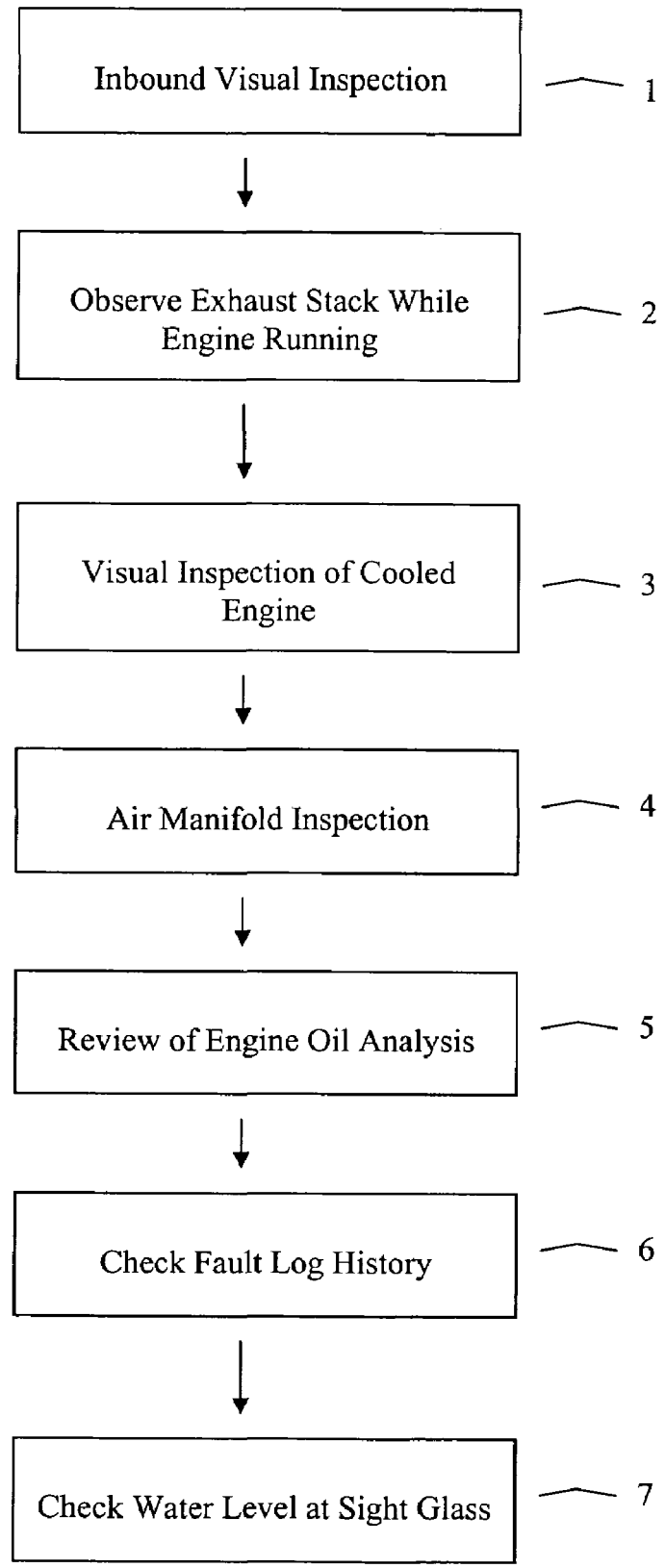
FIG. 1 is a schematic illustration of a method for detecting a water leak in a locomotive.

In order to reduce the time and cost of removing and inspecting non-failed power assemblies, the present inventors have developed an improved method of detecting a water leak in a locomotive, as illustrated in FIG. 1 and described more fully below. The method is discussed with reference to a typical modern locomotive driven by a sixteen cylinder turbo-charged diesel engine, however, one skilled in the art will appreciate that other embodiments of the present invention may be applied to other styles of locomotives and to other machines.

FIG. 1 illustrates steps in an improved lead detection method. Step 1 is an inbound visual inspection for water leaks that may be accomplished while the locomotive engine is heated and operating as it is tested prior to moving into a service facility. This visual inspection should identify the location of leaks that are external to the engine. Areas of interest may include piping, valves, engine water outlet header, water disconnects, sight glass sample valve and water fill valve, automatic drain valve, and the intercooler weep holes.

Step 2 is to observe the exhaust stack with the engine running for signs of white smoke or steam, which would be an indication of water entering the exhaust manifold.

Step 3 is a shop visual inspection similar to the inbound visual inspection of step 1 but performed after the engine has been stopped and cooled. Puddles of treated water or a build up of dried water treatment chemicals (typically green or pink) may be observed.

Step 4 is the inspection of the insides of the air manifolds for dried water treatment chemicals or puddles of treated water. Such inspection may require the removal of the air intake manifold end caps at the number 8 cylinder locations on both the left and right banks of a typical V-16 turbo-charged diesel locomotive engine.

Step 5 is to review a recent engine oil analysis for any indication of water in the engine oil. A new oil analysis may be conducted, or the most recent oil analysis data may be used if it is not too old (older than 20 days, for example). A predetermined quantifiable condemning limit may be established to declare the existence of water in the oil.

Step 6 involves checking the fault log history for the locomotive for any fault that would indicate a low water level, such as a low water level shutdown. The log should be reviewed back to the previous water leak inspection timeframe. Any low water fault that was previously diagnosed and corrected may be ignored provided that no further low water level indications occurred. Simply adding water to the system to raise the water level above an acceptable limit does not constitute a diagnosis and repair.

Step 7 is to check the water level at the sight glass. Locomotive water systems are sealed systems and should have essentially no water loss if operating perfectly. If the water level is below the low mark on the sight glass, further diagnosis will be required to determine the cause of the loss of water.

Further steps in the present method depend upon the results of the above-described inspection steps.

If external leaks were found during inspection steps 1 or 3, those leaks should be recorded, the defect corrected to stop the leak, and the repair checked during a subsequent outbound visual inspection. In this case, any low water level found during inspection step 7 needs no further investigation, and the water level should be filled to an acceptable level and checked during the outbound inspection.

If leaks or indications were found during inspection steps 2, 4, 5 or 6, further water leak diagnosis steps are required, as described below, to identify the exact location of the leak within the engine components. These diagnostic steps serve to isolate the possible water leak locations from one another, as illustrated in FIG. 2, in order to eliminate the uncertainty created by transient water.

Figure 2:
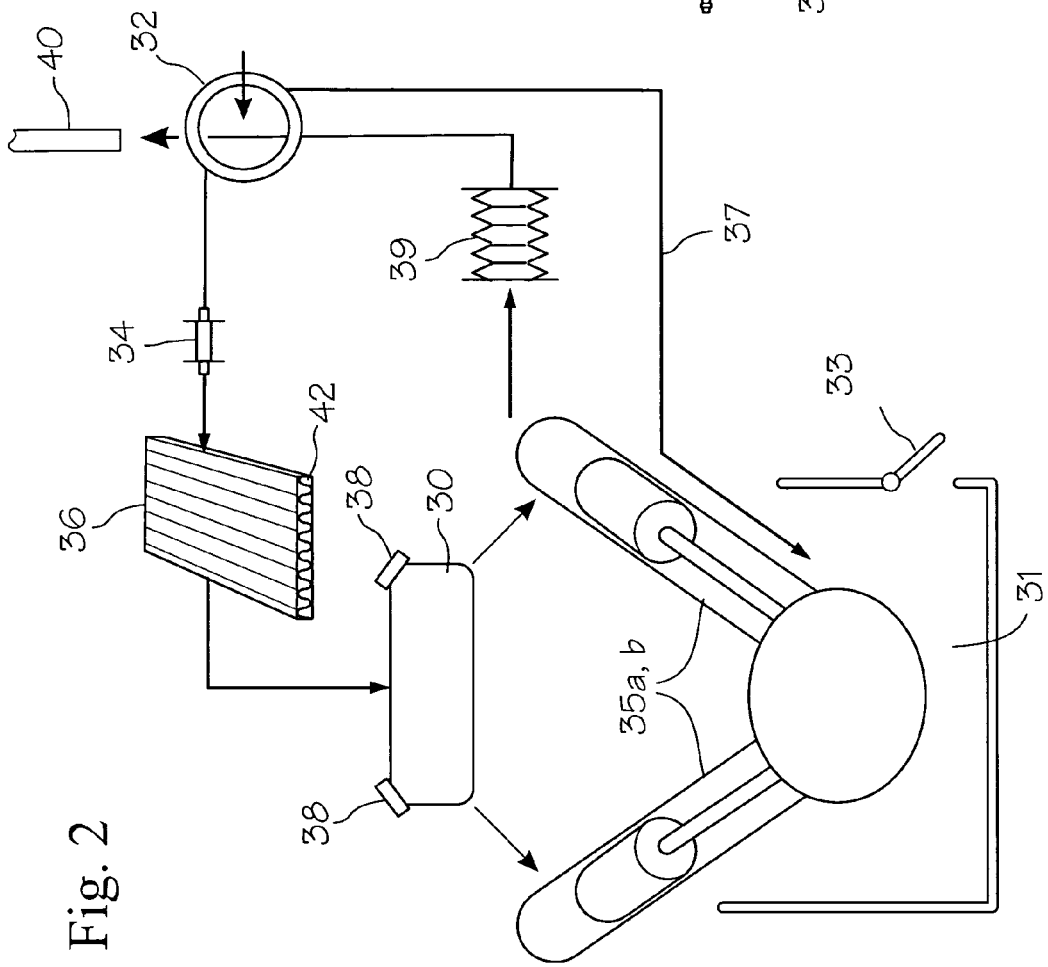
FIG. 2 is a schematic illustration of a typical V-16 turbo-charged diesel locomotive engine and a portion of the cooling system.

FIG. 2 represents a schematic to assist in describing one embodiment of the subject water leak detection system. One skilled in the art will appreciate that many of the engine components are represented symbolically and should not be construed to represent the actual spatial arrangement and proximity of such components in situ. If water indications were present in the air manifold 30 during inspection step 4, the air manifold 30 should be isolated from the turbocharger 32 to prevent water from a leaking turbocharger 32 from entering the intake air manifold 30. This may involve removing or at least partially disassembling a steel sleeve 34 existing in the intake air passageway between the turbocharger 32 and the intercooler 36 between the numbers 1 and 2 cylinders (35a and 35b) on both sides of a V-16 diesel locomotive engine. The air intake manifold end caps 38 should be removed at this time if they had not been removed previously.

If water was found in the oil analysis of inspection step 5, access should be provided to the inside of the crankcase 31 to facilitate visual inspection of the cylinders and turbocharger drain line 37. This may be accomplished by removing crankcase doors 33 provided on the engine.

If the exhaust stack 40 showed indications of water vapor during inspection step 2, the exhaust manifold should be isolated from the turbocharger 32 to eliminate the possibility of transient water there between, such as by dislodging the exhaust bellows 39 located behind the turbocharger 32.

Once the above steps are taken to isolate the potentially leaking components, the cooling system is pressurized to a test pressure, for example 10–12 psi, and the various components are inspected for signs of leakage. A leak in the turbocharger 32 should be evidenced by water leaking into the crankcase 31 through the turbocharger oil drain line 37 or a leak indication from the turbocharger side of the exhaust manifold where the exhaust bellows 39 were dislodged. A water leak from any of the cylinders should be evidenced by water dripping into the crankcase 31 or water accumulating in the air manifold 30 from the leaking cylinder. A water leak from the intercooler 36 should be evidenced by water leaking from the weep hole 42 located at the bottom of the intercooler 36. An internal inspection of the intercooler 36 can be performed by using a mirror and a flashlight. None of these potential leaks can generate transient water that would be misinterpreted as coming from a different component because each component is mechanically isolated from the others, thereby providing a high level of assurance that the source of the leak is correctly identified.

Figure 3:
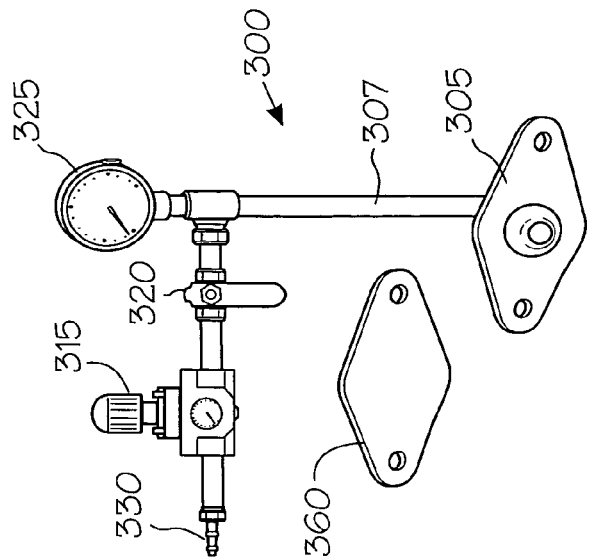
FIG. 3 is a perspective view of a cylinder leak air testing apparatus.

If one or more cylinders indicate signs of a water leak, a further cylinder-specific air leak test may be performed prior to removal of that cylinder power assembly. The air leak test may be performed by using the testing apparatus illustrated in FIG. 3 or other appropriate fixture. With the water drained from the system, a water inlet blanking flange 360 is installed onto the cylinder assembly water inlet port, and the water outlet test fixture 300 is installed onto the water outlet port. In certain embodiments it may be more convenient to reverse the locations of these two parts. The test fixture 310 includes a blanking flange 305 containing a pipe connection and adapted for installation onto the water port. The pipe 307 connected to the flange provides a fluid communication between a source of compressed air, regulated through a pressure regulator 315, and the water jacket of the cylinder being tested. An isolation valve 320 allows the water jacket to be pressurized by the compressed air and then isolated. A pressure gauge 325 is connected to the pipe between the isolation valve 320 and the flange 305 for providing an indication of the pressure inside the cylinder water jacket being tested. The testing apparatus is thus a single device that creates a sealed volume within the water jacket of the specific power assembly to be tested, provides a connection 330 to a supply of compressed air, and provides a pressure indication. Compressed air is slowly introduced into the water jacket via the test fixture 300 to establish a predetermined test pressure, for example 60 psi as indicated on the pressure gauge. The isolation valve 320 on the test fixture 300 is then closed to hold the pressure steady. If the pressure leaks at greater than a predetermined rate, for example if the pressure declines by 2 psi or greater in 5 minutes, the cylinder water leak is confirmed. An individual power assembly may be removed due to a water leak for inspection and repair only if it fails this supplemental air leak test, thereby minimizing the number of non-leaking power assemblies that will be removed.

While various embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. A method of detecting a water leak in a locomotive engine cooling system comprising numerous components, each being a potential source of leakage of water, the method comprising:

performing at least one inspection providing an indication of a water leak from an engine cooling system of a locomotive;

isolating potential sources of the water leak from one another so as to prevent transient water flow between the potential sources;

performing a visual inspection while performing a water pressurization test on the engine cooling system to identify the source of the water leak;

identifying an engine cylinder assembly as a potential source of the water leak during the water pressurization test; and performing an air leak test of the cylinder assembly to confirm that the cylinder assembly is leaking prior to removal of the cylinder assembly from the engine.

2. A method of detecting a water leak in a locomotive engine cooling system comprising numerous components, each being a potential source of leakage of water, the method comprising:

performing at least one inspection providing an indication of a water leak from an engine cooling system of a locomotive;

isolating potential sources of the water leak from one another so as to prevent transient water flow between the potential sources;

performing a visual inspection while performing a water pressurization test on the engine cooling system to identify the source of the water leak;

wherein the step of performing at least one inspection comprises at least one of the group consisting of:

performing a visual inspection to determine if water is leaking from a portion of the cooling system external to the engine;

performing a visual inspection of exhaust of the engine to detect an indication of water vapor in the exhaust;

performing a visual inspection to detect an indication of water leaking into an intake air manifold of the engine;

performing an engine oil analysis to detect water in engine oil;

reviewing a fault log history for the locomotive; and checking a level of coolant in a cooling system sight glass.

3. A method of detecting a water leak in a locomotive engine cooling system comprising numerous components, each being a potential source of leakage of water, the method comprising:

performing at least one inspection providing an indication of a water leak from an engine cooling system of a locomotive;

isolating potential sources of the water leak from one another so as to prevent transient water flow between the potential sources;

performing a visual inspection while performing a water pressurization test on the engine cooling system to identify the source of the water leak; and removing an exhaust bellows to prevent transient water flowing between a cylinder assembly and a turbocharger of the engine.

4. A method of detecting a water leak in a locomotive engine cooling system comprising numerous components, each being a potential source of leakage of water, the method comprising:

performing at least one inspection providing an indication of a water leak from an engine cooling system of a locomotive;

isolating potential sources of the water leak from one another so as to prevent transient water flow between the potential sources;

performing a visual inspection while performing a water pressurization test on the engine cooling system to identify the source of the water leak; and displacing a component between an intercooler and a turbocharger of the engine to prevent transient water flowing there between.

5. A method of detecting a water leak in a locomotive engine cooling system comprising numerous components, each being a potential source of leakage of water, the method comprising:

performing at least one inspection providing an indication of a water leak from an engine cooling system of a locomotive;

isolating potential sources of the water leak from one another so as to prevent transient water flow between the potential sources;

performing a visual inspection while performing a water pressurization test on the engine cooling system to identify the source of the water leak; and opening a crankcase door of the engine to provide visual access for identifying water leaking from a turbocharger drain line or from a cylinder assembly of the engine during the water pressurization test.

6. The method of claim 1, wherein the air leak test further comprises:

installing a blank flange on a first of the group of a water inlet port and a water outlet port of the cylinder assembly;

installing test fixture on a second of the group of the water inlet port and the water outlet port of the cylinder assembly;

applying pressure to a water jacket of the cylinder assembly through the test fixture; and determining that the cylinder assembly is leaking if a sealed pressure within the water jacket decays at greater than a predetermined rate.

7. A method of detecting a water leak in a locomotive engine cooling system comprising numerous components, each being a potential source of leakage of water, the method comprising:

performing at least one inspection providing an indication of a water leak from an engine cooling system of the locomotive, wherein the step of performing at least one inspection comprises at least one of the group consisting of:

(i) performing a visual inspection to determine if water is leaking from a portion of the cooling system external to the engine;

(ii) performing a visual inspection of exhaust of the engine to detect an indication of water vapor in the exhaust;

(iii) performing a visual inspection to detect an indication of water leaking into an intake air manifold of the engine;

(iv) performing an engine oil analysis to detect water in the engine lubricant;

(v) reviewing a fault log history for the locomotive; and (vi) checking a level of a cooling system sight glass;

isolating potential sources of the water leak from one another so as to prevent transient water flow between the potential sources;

performing a visual inspection while performing a water pressurization test on the engine cooling system to identify the source of the water leak; and provided that an engine cylinder assembly is a component identified as a potential source of the water leak during the water pressurization test, the method further comprises performing an air leak test of the cylinder assembly to confirm that the cylinder assembly is leaking prior to removal of the cylinder assembly from the engine.

8. The method of claim 7, wherein performing a visual inspection to determine if water is leaking from a portion of the cooling system external to the engine is conducted a first time while the engine is running and a second time when the engine is stopped and cooled.

9. The method of claim 7, wherein said performing a visual inspection to detect an indication of water leaking into an intake air manifold of the engine comprises removing at least one end cap provided on said intake air manifold.

10. A method of detecting a water leak in a locomotive engine cooling system comprising numerous components, each being a potential source of leakage of water, the method comprising:

performing at least one inspection providing an indication of a water leak from an engine cooling system of the locomotive, wherein the step of performing at least one inspection comprises at least one of the group consisting of:
(i) performing a visual inspection to determine if water is leaking from a portion of the cooling system external to the engine;
(ii) performing a visual inspection of exhaust of the engine to detect an indication of water vapor in the exhaust;
(iii) performing a visual inspection to detect an indication of water leaking into an intake air manifold of the engine;
(iv) performing an engine oil analysis to detect water in the engine lubricant;
(v) reviewing a fault log history for the locomotive; and
(vi) checking a level of a cooling system sight glass;

isolating potential sources of the water leak from one another so as to prevent transient water flow between the potential sources;

performing a visual inspection while performing a water pressurization test on the engine cooling system to identify the source of the water leak; and provided that an engine cylinder assembly is a component identified as a potential source of the water leak during the water pressurization test, the method further comprises performing an air leak test of the cylinder assembly to confirm that the cylinder assembly is leaking prior to removal of the cylinder assembly from the engine; wherein said air leak test comprises:

(i) installing a blank flange on a first of the group of a water inlet port and a water outlet port of the cylinder assembly;

(ii) installing test fixture on a second of the group of the water inlet port and the water outlet port of the cylinder assembly;

(iii) applying pressure to a water jacket of the cylinder assembly through the test fixture; and (iv) determining that the cylinder assembly is leaking if a sealed pressure within the water jacket decays at greater than a predetermined rate.

\* \* \* \* \*